United States Patent [19]

Lewis et al.

[11] 4,053,768

[45] Oct. 11, 1977

[54] METHOD AND APPARATUS FOR IMPROVING CONTRAST IN ELECTROPHORETIC DISPLAY

[75] Inventors: John H. Lewis, Los Angeles; Michael D. McDiarmid, Van Nuys, both of Calif.

[73] Assignee: Xonics, Inc., Van Nuys, Calif.

[21] Appl. No.: 722,276

[22] Filed: Sept. 10, 1976

[51] Int. Cl.[2] .............................................. G03B 41/16

[52] U.S. Cl. ................................................ 250/315 A

[58] Field of Search ......................... 250/315 R, 315 A

[56] References Cited

U.S. PATENT DOCUMENTS

| | | | |
|---|---|---|---|
| 3,939,345 | 2/1976 | Allan | 250/315 A |
| 3,965,352 | 6/1976 | Allan | 250/315 A |

*Primary Examiner*—Craig E. Church

*Attorney, Agent, or Firm*—Harris, Kern, Wallen & Tinsley

[57] ABSTRACT

Apparatus and method for improving contrast in the visual image formed by toner deposited on an electrostatic image such as is formed in electronradiography. Electrophoretic toner particles and a dye are dispersed in a liquid, with the particles being deposited onto a substrate which carries the electrostatic image, with the selectively attracted particles forming the visual image. The visual image is viewed by reflected or scattered light with the light having a color emission spectrum substantially corresponding to the absorption spectrum of the dye for absorbing and thereby eliminating unwanted light.

15 Claims, 3 Drawing Figures

METHOD AND APPARATUS FOR IMPROVING CONTRAST IN ELECTROPHORETIC DISPLAY

BACKGROUND OF THE INVENTION

This invention relates to electrostatic imaging and in particular, to a new and improved process and apparatus for improving the contrast in visual images produced by depositing toner onto an electrostatic image.

In the electronradiography process, an X-ray image of an object is converted into a visual image by absorbing the X-ray radiation and producing electrons and positive ions in an electric field, with the charges being selectively moved towards opposite electrodes to form an electrostatic charge image. A real time imaging system of the electronradiography type is shown in U.S. Pat. No. 3,965,352. In this type of system, the electrostatic charge image is formed on a surface exposed to a dielectric liquid with the toner particles suspended therein. When an appropriate electric field is produced in the system, toner particles are selectively attracted to the electrostatic charge image producing a toner particle image on a substrate which can be viewed by reflected light or scattered light. The process of forming the visual image is reversible by reversing the electric field, leaving the system ready for forming another electrostatic image and a subsequent visual image.

In either mode of viewing, there are stray light rays which deviate from the optimum illumination path because of interaction with internal surfaces of the apparatus and with interfaces between various optical components. These deviant rays illuminate reflective surfaces and light scattering points other than the toner particles, thus producing unwanted background radiation in the optical image or signal. This results in an undesirable reduction in the image contrast.

It is an object of the present invention to provide a new and improved process and apparatus for increasing the contrast in the resultant visual image of an electrostatic imaging system.

SUMMARY OF THE INVENTION

The present invention may be utilized with the real time electrophoretic imaging system shown in U.S. Pat. No. 3,965,352. First and second electrodes are supported in spaced relation with an X-ray absorber and electron and positive ion emitter between the electrodes. A quantity of toner particles and a dye are dispersed in a liquid between the electrodes. Incident X-rays cause ionization in the liquid. A potential is applied across the electrodes attracting electrons toward one electrode and positive ions toward the other, forming an electrostatic charge image to which the toner particles are selectively attracted forming a visual image viewed through one of the electrodes. Illumination is directed onto the viewing electrode with the particles scattering or reflecting light to a viewing position. The incoming illumination is selected to have a color emission spectrum substantially corresponding to the absorption spectrum of the dye so that the light which is not reflected or scattered, is absorbed in the dye thereby reducing undesired rays and enhancing image contrast. Additional features for further reducing unwanted rays are also provided.

DESCRIPTION OF THE PREFERRED EMBODIMENTS

Figure 1:
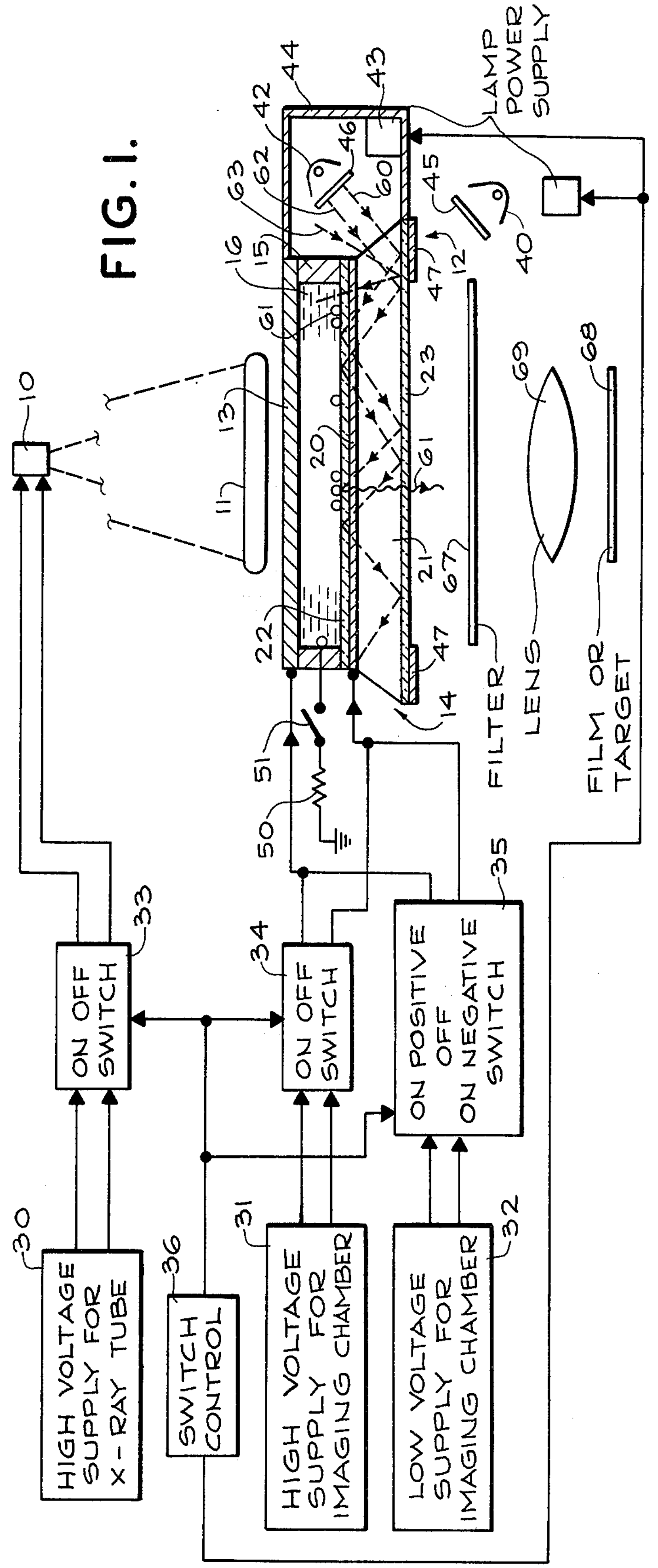
FIG. 1 is a diagrammatic illustration of an electronradiography system with a real time imaging chamber and incorporating the presently preferred embodiment of the invention with scattering type operation.

In the system of FIG. 1 an X-ray source 10 directs radiation through a body 11 to an imaging chamber 12. The imaging chamber includes an upper electrode 13 and a lower electrode 14 separated by spacers 15 defining a gap 16 between the electrodes.

The upper electrode 13 should be of a material which is relatively transparent to X-ray radiation and beryllium is a preferred metal. The lower electrode 14 should be relatively transparent optically and typically may comprise a thin transparent film 20 of an electrical conducting material such as a metal oxide on a glass or plastic support plate 21. A dielectric film 22 is applied on the gap surface of the electrode film 20, and typically may be a thin plastic sheet. If desired, a conventional non-reflecting film 23 may be applied on the outer surface of the support plate 21.

Electrical power supplies are provided for the X-ray source and the imaging chamber and typically may include a high voltage supply 30 for the X-ray tube, a high voltage supply 31 for the imaging chamber, and a low voltage supply 32 for the imaging chamber. The voltage supply to the X-ray source 10 is controlled by an on-off switch 33. The voltage supply to the imaging chamber 12 is controlled by an on-off switch 34 and another switch 34 which can provide a positive supply, a negative supply and an off condition. The sequence of operation of the switches 33, 34, 35 is controlled by a switch control unit 36.

The image formed in the chamber 12 may be viewed by reflected light or by scattered light. A lamp 40 energized from a power supply 41 directs light through a filter 45 onto the electrode 14 for reflection illumination. Another lamp 42 energized from a power supply 43 is mounted in a closed housing 44 at one edge of the imaging chamber for directing light through a filter 46 into the plate 21 to provide dark field illumination and scattered light viewing. An opaque frame 47 may be provided if desired.

In the embodiment illustrated, the gap 16 between the electrodes is filled with a liquid X-ray absorber and electron and positive ion emitter. Reference may be had to U.S. Pat. No. 3,873,833 for additional information on the liquid absorber and emitter. Electrophoretic particles 61 are suspended in the liquid in the gap.

A typical operating cycle may be divided into time segments A, B, C and D. At the end of time segment A, there is no voltage across the electrodes and the electrophoretic particles 61 are dispersed throughout the liquid absorber in the gap 16. In time segment B, the X-ray source is energized and a high voltage is connected across the electrodes with the electrode 14 negative. Incoming X-rays are absorbed in the gap and electrons (or negative ions) and positive ions are generated in the gap. The electrons are rapidly moved to the electrode 13 and the positive ions are rapidly moved to the electrode 14 under the influence of the field through the gap, providing the electrostatic charge image. The electrostatic charge image remains after the X-ray source is turned off in time segment C. The electrophoretic particles 61 are relatively bulky compared to the electrons and positive ions and therefore do not travel nearly as fast as the electrons and positive ions, that is, thereis a substantial differential in the mobility of the particles and the electrons and ions in the liquid absorber. Hence, the particles remain in the liquid during the relatively short time of segment C while the high voltage is connected across the electrodes. The voltage across the electrodes is reduced in time segment D and electrophoretic particles are attracted to the electrode 14 at those portions which do not have positive ions thereon. The positively charged electrophoretic particles are repelled by the positive ions on the electrode 14. This selective depositing of the particles provides the desired image which can be viewed during the time segment D.

At the end of the viewing time, the potential across the electrodes may be reversed for a short time during time segment A to move the particles from the electrode back into the dispersion. A typical exposure and viewing cycle may occur in one-tenth of a second, providing 10 viewing frames per second. It is desirable to discharge any remaining charge in the liquid before the next X-ray exposure in segment B and this may be accomplished by providing an electrical connection from the liquid to ground through a resistor 50 and a switch 51. The switch 51 may be closed during time segment A to accomplish the discharge. Alternatively, the switch 51 may be omitted with a direct connection through the resistor to circuit ground, with parameters chosen so that the ground connection does not adversely affect the operation during X-ray exposure but does accomplish the desired discharge function.

In the dark field illumination mode of viewing shown in FIG. 1, a light wave of substantially total internal reflection is produced in the plate 21. This may be achieved by introducing light from the lamp 42 into the edge of the plate 21 at the appropriate angle for achieving internal reflection at the interfaces. When a small particle rests on the external surface at the reflection interface, it will disrupt the incident internal wave and scatter the radiation, thus becoming a point source of light when viewed from the exterior of the imaging chamber. Other locations on the inner surface of the electrode 14 which do not have a particle to serve as a scattering center will appear darker.

A dye is dispersed in the liquid in the gap 16. The dye is selected to have an absorption spectrum which corresponds to the color emission spectrum of the lamp 42. Then the light rays which are not scattered by the toner particles are absorbed by the dye. This substantially reduces the background level and thereby improves the contrast of the visual image. Referring to FIG. 1, the ray 60 is correctly oriented for internal reflection and scatters off a toner particle producing ray 61 directed toward the viewing position. The ray 62 is correctly oriented and undergoes total internal reflection without encountering a toner particle. Ray 63 is a stray light ray which enters the gap 16 and is absorbed by the dye instead of reflecting toward the viewing position and contributing to unwanted background illumination.

The closer the match is between the emission spectrum of the source and the absorption spectrum of the dye, the better the contrast in the visual image. The filter 46 may be used to improve the matching of the two spectra by absorbing light from the lamp which the dye will not absorb, while transmitting the other portions of the emission spectrum.

By way of example, a low color temperature source such as a sodium lamp may be used in conjunction with a blue dye. Stray yellowish light would then be strongly absorbed by the blue dye. The spectrum matching may be aided by placing a yellow filter in front of the light source. Also, a red filter 67 can be used as a viewing filter to further darken the blue background.

As another example, a light source with a high color temperature such as a fluorescent tube or a Xenon flash lamp may be used in conjunction with a red dye, and a blue viewing filter. When using a light source which emits strongly in the ultraviolet wavelength region, such as Xenon flash lamp, the contrast may be enhanced by selecting filters 46 and 67 to transmit in the ultraviolet region but not in the visual region. A Wratten No. 18A filter is suitable for this purpose. A film or a television picture tube target 68 sensitive to ultraviolet wavelengths may be used at the viewing position for detecting the image. A lens 69 may be utilized for focussing the image if desired. When the viewing lamp is of the flash type productng a pulse of light of relatively high intensity and short duration, the lamp pulsing may be synchronized with the operation of the imaging chamber such that illumination is on during optimum viewing periods and off during transitional time segments.

Figure 2:
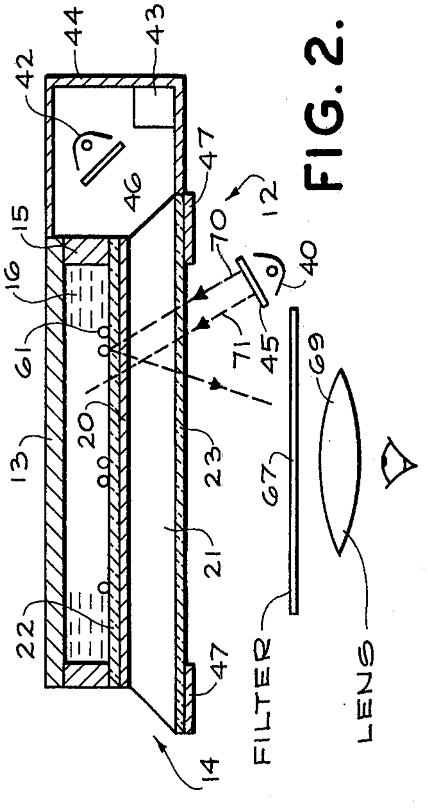
FIG. 2 is a view of the imaging chamber portion of the system of FIG. 1 with reflecting type operation.

The operation of the system in the reflection mode is illustrated in FIG. 2. A light ray 70 from the lamp 40 encounters a toner particle and is reflected back toward the viewing position. Another light ray 71 does not encounter toner particles and is absorbed in the dye.

Figure 3:
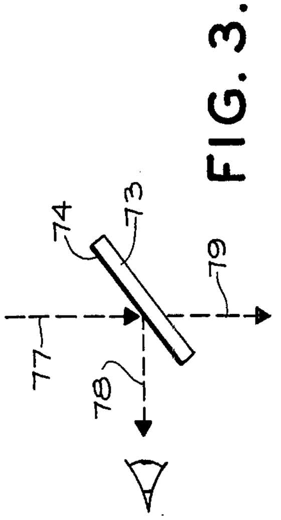
FIG. 3 illustrates an alternative configuration for a portion of the system of FIGS. 1 and 2.

An alternative to the viewing filter 67 is illustrated in FIG. 3, comprising a partial mirror 73 having a reflective coating 74. The coating 74 is selected to reflect radiation in the wavelengths of the emission from the light source while passing other wavelengths. Hence a ray 77 reflected or scattered from a particle will be reflected along path 78 toward the viewing position, while other radiation of other wavelengths will pass through the mirror along path 79. Further improvement in contrast may be achieved by utilizing the anti-reflective coating 23 which improves transmission of the image out of the imaging chamber and prevents extraneous light which is incident on the chamber from being reflected back towards the viewing position. When using a film or a television camera for recording the image, the film or the camera target can be chosen such that it has reduced sensitivity in those portions of the spectrum in which unwanted background signal exists.

The rays scattered by the toner particles are polarized. The filter 67 may be a polarizing filter which is oriented to transmit the polarized rays from the particles, while reducing or blocking the non-polarized rays.

Various conventional dyes may be utilized. Preferably, the dye dispersed in the liquid should have a high optical density and a low electrical conductivity. Both density and conductivity will vary with the dye and with the liquid. If it is desired to have a blue dye with a specific liquid in a particular application, the various blue dyes available on the market can be tested to determined which gives the best combination of high optical density and low electrical conductivity.

We claim:

1. In an electronradiography imaging chamber for providing a visual image, the combination of:

first and second electrodes;

means for supporting said electrodes in spaced relation with a gap therebetween;

an X-ray absorber and electron and positive ion emitter in said gap, with X-ray radiation entering said gap being absorbed and providing electrons and positive ions in said gap;

a plurality of electrophoretic particles dispersed in a liquid in said gap;

a dye dispersed in said liquid, said dispersed dye having a color absorption spectrum;

means for connecting an electrical potential across said electrodes for attracting electrons toward one electrode and positive ions toward the other depending upon the polarity of the power source and forming an electrostatic charge image, with said particles being selectively deposited as a function of said electrostatic charge image forming a visual image viewable through one of said electrodes; and means for directing illumination onto deposited particles, with said illumination having a color emission spectrum substantially corresponding to said dye absorption spectrum.

2. Apparatus as defined in claim 1 including a filter disposed between said visual image and a viewing position, with said filter having a relatively high transmission at the emission spectrum of said illumination and a relatively low transmission at other wavelengths.

3. Apparatus as defined in claim 1 wherein said means for directing illumination includes a filter disposed between an illumination source and said visual image, with said filter having a relatively high transmission at said dye absorption spectrum and a relatively low transmission at other wavelengths.

4. Apparatus as defined in claim 1 wherein said means for directing illumination includes an illumination source having a relatively high output at said dye absorption spectrum and a relatively low output at other wavelengths.

5. Apparatus as defined in claim 1 wherein said means for directing illumination directs illumination onto said one electrode with the deposited particles reflecting rays and with the dye absorbing non-reflected rays.

6. Apparatus as defined in claim 1 wherein said one electrode includes an optically transparent support plate with an electrically conducting layer thereon, and said means for directing illumination directs illumination into said plate from an edge with the deposited particles scattering rays and with said dye absorbing rays which enter said liquid.

7. Apparatus as defined in claim 1 including a partial mirror disposed between said visual image and a viewing position, with said mirror having relatively high reflectivity at the emission spectrum of said illumination and relatively high transmission at other wavelengths.

8. Apparatus as defined in claim 1 including an antireflectivity coating on the exterior surface of said one electrode.

9. Apparatus as defined in claim 1 including a window disposed between said visual image and a viewing position, with said window having a polarizing transmission characteristic oriented at substantially the same angle as the polarized rays scattered from said particles.

10. Apparatus as defined in claim 1 wherein said means for directing illumination includes a sodium vapor lamp, and said dye is blue.

11. Apparatus as defined in claim 10 including a red filter disposed between said lamp and said visual image.

12. Apparatus as defined in claim 1 wherein said means for directing illumination includes a Xenon flash lamp, and said dye is red.

13. Apparatus as defined in claim 12 including a blue filter disposed between said lamp and said visual image.

14. Apparatus as defined in claim 1 wherein said means for directing illumination includes a fluorescent lamp, and said dye is red.

15. Apparatus as defined in claim 14 including a blue filter disposed between said lamp and said visual image.

* * * * *